US011047740B2

(12) United States Patent
Wei et al.

(10) Patent No.: US 11,047,740 B2
(45) Date of Patent: *Jun. 29, 2021

(54) PLANE SOURCE BLACKBODY

(71) Applicants: Tsinghua University, Beijing (CN); HON HAI PRECISION INDUSTRY CO., LTD., New Taipei (TW)

(72) Inventors: Yang Wei, Beijing (CN); Guang Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 141 days.

This patent is subject to a terminal disclaimer.

(21) Appl. No.: 16/244,449

(22) Filed: Jan. 10, 2019

(65) Prior Publication Data

US 2020/0025621 A1     Jan. 23, 2020

(30) Foreign Application Priority Data

Jan. 11, 2018  (CN) .......................... 201810026973.0

(51) Int. Cl.
*B82Y 40/00* (2011.01)
*G01J 5/02* (2006.01)
(Continued)

(52) U.S. Cl.
CPC ............. *G01J 5/522* (2013.01); *G01J 5/0225* (2013.01); *B82Y 40/00* (2013.01); *C01B 2202/08* (2013.01); *G01J 2005/0048* (2013.01)

(58) Field of Classification Search
CPC .......... G01J 5/522; G01J 5/0225; G01J 5/023; B82Y 30/00; B82Y 40/00; C01B 2202/08
See application file for complete search history.

(56) References Cited

U.S. PATENT DOCUMENTS 7,354,877 B2 *   4/2008   Rosenberger ............. B32B 5/26
                                                                442/194
8,741,422 B2     6/2014   Miao
(Continued)

FOREIGN PATENT DOCUMENTS

CN         2622629        6/2004
CN        101400198       4/2009
(Continued)

OTHER PUBLICATIONS

Shimizu et al., Blackbody Thermal Radiator with Vertically Alighned Carbon Nanotube Coating, Japanese Journal of Applied Physics, May 15, 2014, 068004-1~068004-3.
(Continued)

*Primary Examiner* — Wyatt A Stoffa
(74) *Attorney, Agent, or Firm* — ScienBiziP, P.C.

(57) ABSTRACT

The present invention relates to a plane source blackbody. The plane source blackbody comprises a panel, a black lacquer layer, and a carbon nanotube array. The panel comprises a first surface and a second surface opposite to the first surface. The black lacquer layer and the carbon nanotube array are located on the first surface. The carbon nanotube array comprises a plurality of carbon nanotubes. Each of the carbon nanotubes comprises a top end and a bottom end. The bottom end of each of the carbon nanotubes is immersed into the black lacquer layer and the top end of each of the carbon nanotubes is exposed out from the black lacquer layer. The plurality of carbon nanotubes are substantially perpendicular to the first surface of the pane.

15 Claims, 5 Drawing Sheets

(51) Int. Cl.
*G01J 5/52* (2006.01)
*G01J 5/00* (2006.01)

(56) References Cited

U.S. PATENT DOCUMENTS

| | | | |
|---|---|---|---|
| 8,828,749 B2* | 9/2014 | Darnon | B82Y 35/00 438/17 |
| 9,067,791 B2* | 6/2015 | Kim | B82Y 30/00 |
| 9,630,849 B2* | 4/2017 | Wei | B32B 15/00 |
| 9,833,772 B2* | 12/2017 | Cola | B01J 23/72 |
| 9,964,783 B2* | 5/2018 | Huynh | B32B 27/00 |
| 10,125,022 B2* | 11/2018 | Misra | B82Y 40/00 |
| 10,260,953 B2* | 4/2019 | Engelbart | G01N 25/72 |
| 10,392,127 B2* | 8/2019 | Kruckenberg | B64D 45/02 |
| 10,571,339 B2* | 2/2020 | Wei | G01J 5/023 |
| 2007/0134599 A1* | 6/2007 | Raravikar | B82Y 30/00 430/325 |
| 2008/0192797 A1* | 8/2008 | Ko | G05D 23/19 374/2 |
| 2009/0085461 A1 | 4/2009 | Feng et al. | |
| 2009/0096348 A1 | 4/2009 | Liu et al. | |
| 2009/0135042 A1* | 5/2009 | Umishita | H05K 9/0083 342/1 |
| 2009/0321420 A1 | 12/2009 | Feng et al. | |
| 2010/0021736 A1* | 1/2010 | Slinker | H01L 21/4871 428/408 |
| 2010/0068461 A1* | 3/2010 | Wallace | B81C 1/00111 428/156 |
| 2010/0075024 A1* | 3/2010 | Ajayan | C08K 7/24 427/66 |
| 2011/0108545 A1 | 5/2011 | Wang et al. | |
| 2011/0217451 A1 | 9/2011 | Veerasamy | |
| 2011/0241536 A1* | 10/2011 | Ajayan | C08K 7/24 313/498 |
| 2011/0315882 A1 | 12/2011 | Hu et al. | |
| 2012/0021164 A1* | 1/2012 | Sansom | B29C 70/64 428/95 |
| 2012/0104213 A1 | 5/2012 | Feng et al. | |
| 2012/0107597 A1* | 5/2012 | Kim | B82Y 30/00 428/292.1 |
| 2012/0312773 A1 | 12/2012 | Cheng et al. | |
| 2012/0321961 A1* | 12/2012 | Yushin | H01M 4/133 429/231.8 |
| 2013/0137324 A1* | 5/2013 | Tang | C09D 5/006 442/131 |
| 2013/0190442 A1* | 7/2013 | Mezghani | D01F 1/10 524/496 |
| 2013/0295320 A1* | 11/2013 | Liu | B32B 5/12 428/113 |
| 2014/0037895 A1* | 2/2014 | Jiang | H01J 9/025 428/119 |
| 2015/0048249 A1* | 2/2015 | Hedler | H01L 35/00 250/338.4 |
| 2015/0367557 A1 | 12/2015 | Wei et al. | |
| 2016/0279995 A1* | 9/2016 | Langos | B41J 11/0015 |
| 2017/0029275 A1* | 2/2017 | Starkovich | C01B 32/168 |
| 2017/0120220 A1* | 5/2017 | Watanabe | B01J 21/18 |
| 2017/0283262 A1* | 10/2017 | Humfeld | C01B 32/16 |
| 2018/0145331 A1* | 5/2018 | Yushin | H01M 4/366 |
| 2018/0179391 A1* | 6/2018 | Bahlawane | C09D 7/70 |
| 2018/0346157 A1* | 12/2018 | Werth | F02K 9/58 |
| 2019/0374974 A1* | 12/2019 | Yoshida | B01J 20/3204 |

FOREIGN PATENT DOCUMENTS

| | | |
|---|---|---|
| CN | 101409961 | 4/2009 |
| CN | 102452647 | 5/2012 |
| CN | 103382023 | 11/2013 |
| CN | 103602132 | 2/2014 |
| CN | 105197875 | 12/2015 |
| CN | 105562307 | 5/2016 |
| CN | 105675143 | 6/2016 |
| CN | 107014494 | 8/2017 |
| JP | 2015-203589 | 11/2015 |
| JP | 2017-3565 | 1/2017 |
| JP | 2017-24942 | 2/2017 |
| TW | 200834046 | 8/2008 |
| TW | 201125419 | 7/2011 |
| TW | 201144217 | 12/2011 |
| TW | 201250720 | 12/2012 |
| TW | I410615 | 10/2013 |
| TW | I486090 | 5/2015 |
| TW | 201625937 | 7/2016 |
| WO | 2016/107883 | 7/2016 |

OTHER PUBLICATIONS

Lim Zhi Han, Investigation of Laser-Carbon Nanotubes Interaction and Development of CNT-Based Devices, Ph.D Theses, Oct. 12, 2010, Check(https://scholar.google.com/scholar?as_q=&as_epq=Investigation of Laser-Carbon Nanotubes Interaction and Development of CNT-Based Devices&as_occt=any).

Kohei Mizuno et al., A Black Body Absorber from Vertically Aligned Single-walled Carbon Nanotubes, PNAS, Apr. 14, 2009, 6044-6047, vol. 106, No. 15.

Zhao Jun Han et al., Large-Diameter Single-Walled Carbon Nanotubes, J. Am. Chem. Soc., Mar. 12, 2012, 6018-6024, 134, 13.

Kohei Mizuno et al. A black body absorber from vertically aligned single-walled carbon nanotubes, Proceedings of the Natinal Academy of Sciences, Apr. 14, 2009, vol. 106, 6044-6047.

* cited by examiner

PLANE SOURCE BLACKBODY

CROSS-REFERENCE TO RELATED APPLICATIONS

This application claims all benefits accruing under 35 U.S.C. § 119 from China Patent Application No. 201810026973.0, filed on Jan. 11, 2018, in the China National Intellectual Property Administration, the contents of which are hereby incorporated by reference. This application is related to applications entitled, "BLACKBODY RADIATION SOURCE", filed Jan. 10, 2019 (Ser. No. 16/244,455), "BLACKBODY RADIATION SOURCE", filed Jan. 10, 2019 (Ser. No. 16/244,468), "BLACKBODY RADIATION SOURCE", filed Jan. 10, 2019 (Ser. No. 16/244,474), "BLACKBODY RADIATION SOURCE", filed Jan. 10, 2019 (Ser. No. 16/244,481), "PLANE SOURCE BLACKBODY", filed Jan. 10, 2019 (Ser. No. 16/244,488), "CAVITY BLACKBODY RADIATION SOURCE AND METHOD OF MAKING THE SAME", filed Nov. 11, 2018 (Ser. No. 16/198,549), "CAVITY BLACKBODY RADIATION SOURCE", filed Nov. 11, 2018 (Ser. No. 16/198,565), "PLANE SOURCE BLACKBODY", filed Nov. 11, 2018 (Ser. No. 16/198,577), "CAVITY BLACKBODY RADIATION SOURCE AND METHOD OF MAKING THE SAME", filed Nov. 11, 2018 (Ser. No. 16/198,590), "CAVITY BLACKBODY RADIATION SOURCE AND METHOD OF MAKING THE SAME", filed Nov. 11, 2018 (Ser. No. 16/198,598), and "PLANE SOURCE BLACKBODY", filed Nov. 11, 2018 (Ser. No. 16/198,606).

FIELD

The present disclosure relates to a plane source blackbody.

BACKGROUND

With a rapid development of infrared remote sensing technology, the infrared remote sensing technology is widely used in military fields and civilian fields, such as earth exploration, weather forecasting, and environmental monitoring. Known infrared detectors need to be calibrated by a blackbody before they can be used. The higher an effective emissivity of the blackbody, the higher a calibration accuracy of the infrared detector. Used as a standard radiation source, a role of blackbody is increasingly prominent. The blackbody comprises a cavity blackbody and a plane source blackbody. Wherein, the effective emissivity of the plane source blackbody mainly depends on a surface structure of the plane source blackbody and an emissivity of materials on a surface of the plane source blackbody. Therefore, to obtain plane source blackbody with high performance, it is important to use surface materials with high emissivity.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the exemplary embodiments. Moreover, in the drawings, like reference numerals designate corresponding parts throughout the several views.

DETAILED DESCRIPTION

Figure 1:
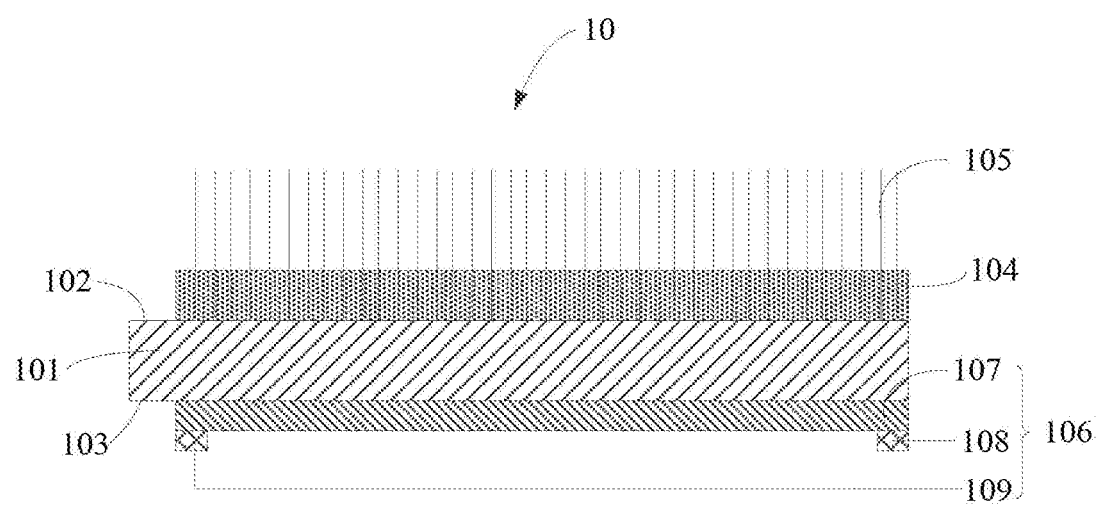
FIG. 1 is a schematic view of a cross-sectional shape of one embodiment of a plane source blackbody.

The disclosure is illustrated by way of embodiments and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "include," when utilized, means "include, but not necessarily limited to"; it specifically indicates open-ended inclusion or membership in the so-described combination, group, series, and the like.

A plane source blackbody is provided according to the present disclosure. The plane source blackbody comprises a panel, a black lacquer layer, and a carbon nanotube array. The panel comprises a first surface and a second surface opposite to the first surface. The black lacquer layer and the carbon nanotube array are located on the first surface of the panel. The carbon nanotube army comprises a plurality of carbon nanotubes. Each of the carbon nanotubes comprises a top end and a bottom end. The bottom end of each of the carbon nanotubes is immersed into the black lacquer, and the top end of each of the carbon nanotubes is exposed out from the black lacquer layer. The plurality of carbon nanotubes are substantially perpendicular to the first surface of the panel.

The panel is made from a material resistant to high temperature and having a high emissivity. The panel can be made from a hard aluminum material, an aluminum alloy material or an oxygen-free copper. In one embodiment, the first surface can be a flat surface. In another embodiment, the first surface can comprise a plurality of grooves.

The black lacquer has high emissivity, such as PYROMARK® 1200 black lacquer having an emissivity of 0.92, NEXTEL® Velvet 811-21 black lacquer having an emissivity of 0.95. A thickness of the black lacquer layer should not be too small or too large. If the thickness of the black lacquer layer is too small, the bottom end of each carbon nanotube cannot be immersed into the black lacquer completely. Therefore, the plurality of carbon nanotubes cannot be contact with the black lacquer tightly and cannot be firmly fixed to the first surface of the panel. On the contrary, if the thickness of the black lacquer layer is too large, the plurality of carbon nanotubes can be embedded into the black lacquer. So a structure of the carbon nanotube array would be destroyed, and the high emissivity of carbon nanotube materials cannot be exhibited. In one embodiment, the thickness of the black lacquer layer is in a range from about 1 micrometer to about 300 micrometers.

The carbon nanotube array comprises a bottom surface and a top surface. The bottom surface is in contact with the first surface of the panel, and the top surface is far away from the first surface of the panel. The plurality of carbon nanotubes extend from the bottom surface to the top surface.

In one embodiment, the top ends of the carbon nanotubes are open ends, and the open ends of the carbon nanotubes are not blocked by catalysts particles or something else.

In another embodiment, the plane source blackbody further comprises a heating element. The heating element is placed on the second surface of the panel. The heating element can comprise a carbon nanotube structure, a first electrode and a second electrode. The first electrode and the second electrode are spaced apart from each other on a surface of the carbon nanotube structure. The carbon nanotube structure comprises at least one carbon nanotube film or at least one carbon nanotube long wire. The carbon nanotube structure comprises a plurality of carbon nanotubes joined end to end and substantially oriented along a same direction. The plurality of carbon nanotubes of the carbon nanotube structure extend from the first electrode toward the second electrode.

Because the carbon nanotube structure is placed on the second surface of the panel, after energized by the first electrode and the second electrode, the carbon nanotube structure can heat the whole plane source blackbody. Therefore, a temperature field on the first surface of the panel can be evenly distributed, and a temperature stability and uniformity of the plane source blackbody can be improved. Since carbon nanotube has low density and light weight, the plane source blackbody using the carbon nanotube structure as the heating element is light and compact. The carbon nanotube structure has low electrical resistance, high electrothermal conversion efficiency and low thermal resistivity. So using the carbon nanotube structure to heat the plane source blackbody has the characteristics of rapid temperature rise, small thermal hysteresis and fast heat exchange rate. Carbon nanotube materials have excellent toughness, thus the plane source blackbody using the carbon nanotube structure as the heating element has a long service life.

Referring to the FIG. 1, a plane source blackbody 10 is provided according to one embodiment. The plane source blackbody 10 comprises a panel 101. The panel 101 comprises a first surface 102 and a second surface 103 opposite to the first surface 102. A black lacquer layer 104 and a carbon nanotube array 105 are located on the first surface 102 of the panel 101. The carbon nanotube array 105 comprises a plurality of carbon nanotubes. Each of the carbon nanotubes comprises a top end and a bottom end. The bottom end of each of the carbon nanotubes is immersed into the black lacquer layer 104, and the top end of each of the carbon nanotubes is exposed out from the black lacquer layer 104. The plurality of carbon nanotubes are substantially perpendicular to the first surface 102 of the panel 101.

The panel 101 is made from an aluminum alloy material. The first surface 102 of the panel 101 is a flat surface. The black lacquer is NEXTEL® Velvet 811-21 black lacquer. A thickness of the black lacquer layer 104 is 150 micrometers. The top end of each of the carbon nanotubes is an open end. The plane source blackbody 10 further comprises a heating element 106 on the second surface 103 of the panel 101. The heating element 106 comprises a carbon nanotube structure 107, a first electrode 108 and a second electrode 109.

A method for making the plane source blackbody 10 is provided in one embodiment. The method comprises the following steps:

S11, providing a panel 101, wherein the panel 101 comprises a first surface 102 and a second surface 103 opposite to the first surface 102;

S12, coating the first surface 102 with a black lacquer layer 104;

S13, placing a carbon nanotube array 105 on the first surface 103.

In the step S11, the panel 101 is made from an aluminum alloy material. The first surface 102 of the panel 101 is a flat surface.

In the step S12, the black lacquer is NEXTEL® Velvet 811-21 black lacquer. A thickness of the black lacquer layer 104 is 150 micrometers.

In the step S13, the carbon nanotube array 105 can be placed on the first surface 102 of the panel 101 by a method of transfer. The method comprises the following steps:

S131, providing a substrate, wherein a carbon nanotube array is grown on a surface of the substrate;

S132, transferring the carbon nanotube array on the first surface 102 of the panel 101.

In the step S131, The carbon nanotube array is grown by a method of chemical vapor deposition. The carbon nanotube array comprises a plurality of carbon nanotubes 105. The ends of the plurality of carbon nanotubes adjacent to the substrate are defined as growth ends, and the ends of the plurality of carbon nanotubes far away from the substrate are defined as top ends.

In the step S132, the substrate is inverted. The top ends of the plurality of carbon nanotubes are in contact with and then are immersed into the black lacquer 104 located on the first surface 102 of the panel 101. The substrate is pressed slightly, and then the substrate is separated from the panel 101 and leaving the plurality of carbon nanotubes on the panel 101. Thereby, the carbon nanotube array can be transferred on the first surface 102 of the panel 101.

After the plurality of carbon nanotubes 105 are placed on the first surface 102 of the panel 101, the black lacquer can be solidified through a process of natural drying. Because the black lacquer is of certain viscosity, the plurality of carbon nanotubes 105 can be tightly fixed on the first surface 102 of the panel 101 through the black lacquer layer 104 and may not easily fall off from the first surface 102. Hence, the panel 101, the black lacquer layer 104 and the plurality of carbon nanotubes 105 become a stable and integrated structure.

Figure 2:
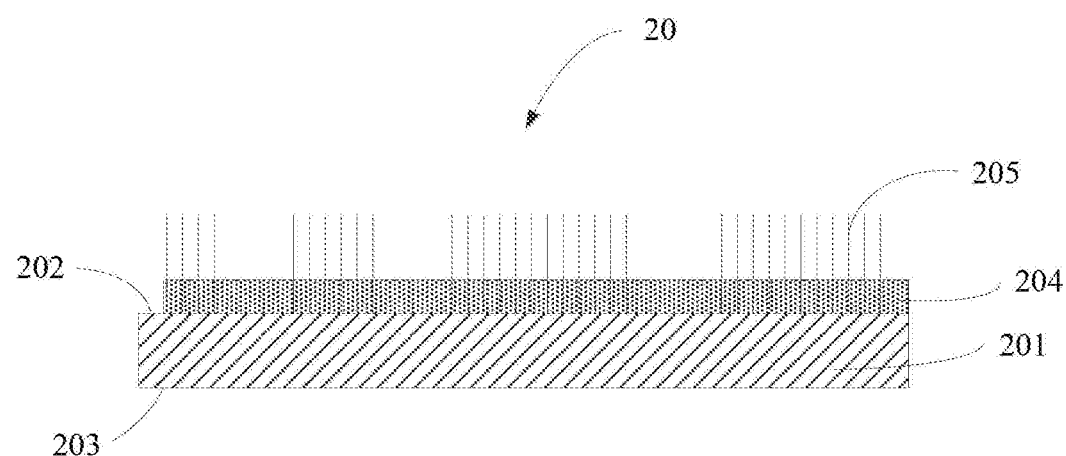
FIG. 2 is a schematic view of a cross-sectional shape of one embodiment of a plane source blackbody.

Referring to the FIG. 2, a plane source blackbody 20 is provided according to one embodiment. The plane source blackbody 20 comprises a panel 201. The panel 201 comprises a first surface 202 and a second surface 203 opposite to the first surface 202. Wherein, a black lacquer layer 204 and a carbon nanotube array 205 are located on the first surface 202 of the panel 201. The carbon nanotube array 205 comprises a plurality of carbon nanotubes. Each of the carbon nanotubes comprises a top end and a bottom end. The bottom end of each of the carbon nanotubes is immersed into the black lacquer, and the top end of each of the carbon nanotubes is exposed out from the black lacquer layer. The plurality of carbon nanotubes are substantially perpendicular to the first surface 202 of the panel 201. A distribution of the plurality of carbon nanotubes on the first surface 202 of the panel 201 forms a pattern.

By "pattern", it means that the first surface 202 of the panel 201 is partially covered by the plurality of carbon nanotubes. A shape and position of the pattern are not limited. The panel 201 is made from an oxygen-free copper. The first surface 202 is a flat surface.

A method for making the plane source blackbody 20 is provided in one embodiment. The method comprises the following steps:

S21, providing a panel 201, wherein the panel 201 comprises a first surface 202 and a second surface 203 opposite to the first surface 202;

S22, coating the first surface 202 with a black lacquer layer 204;

S23, placing a carbon nanotube array 205 on a part area of the first surface 202.

In the step S21, the panel 201 is made from an oxygen-free copper. The first surface 202 is a flat surface.

A specific operation method of the step S22 is the same as that of the step S12, and will not be described in detail here.

In the step S23, the carbon nanotube array 205 are placed on the part area of the first surface 202 of the panel 201 via a method of transfer. The method comprises the following steps:

S231, providing a substrate, wherein a patterned carbon nanotube array is grown on a surface of the substrate;

S232, Transferring the patterned carbon nanotube array on the first surface 202 of the panel 201.

In the step S231, a method for making the patterned carbon nanotube array comprises: forming a patterned mask on the surface of the substrate, wherein the patterned mask can make part of the surface of the substrate exposed; depositing a catalyst on the exposed surface of the substrate to obtain a patterned catalyst; growing a patterned carbon nanotube array on the patterned catalyst by the method of chemical vapor deposition.

A specific operation method of the step S232 is the same as that of the step S132, and will not be described in detail here.

Figure 3:
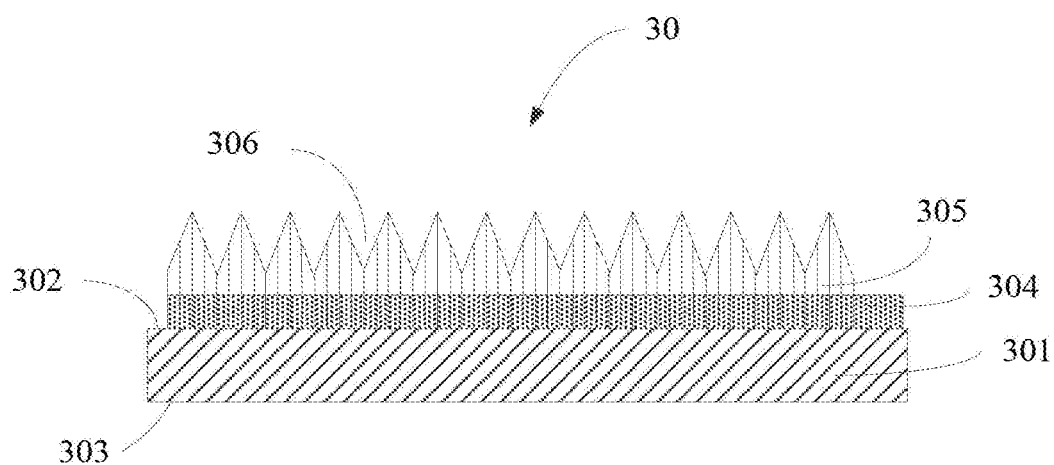
FIG. 3 is a schematic view of a cross-sectional shape of one embodiment of a plane source blackbody.

Referring to the FIG. 3, a plane source blackbody 30 is provided in one embodiment. The plane source blackbody 30 comprises a panel 301. The panel 301 comprises a first surface 302 and a second surface 303 opposite to the first surface 302. Wherein, a black lacquer layer 304 and a carbon nanotube array 305 are located on the first surface 302 of the panel 301. The carbon nanotube array 305 comprises a plurality of carbon nanotubes. Each of the carbon nanotubes comprises a top end and a bottom end. The bottom end of each of the carbon nanotubes is immersed into the black lacquer layer 304, and the top end of each of the carbon nanotubes is exposed out from the black lacquer layer 304. The plurality of carbon nanotubes are substantially perpendicular to the first surface 302 of the panel 301. The carbon nanotube array 305 comprises a top surface and a bottom surface opposite to the top surface. The top surface of the carbon nanotube array 305 is far away from the first surface 302 of the panel 301. A plurality of microstructures are formed on the top surface of the carbon nanotube array 305.

In one embodiment, the plurality of microstructures comprises a plurality of micro-grooves 306 formed on the top surface of the carbon nanotube array 305. Each of the micro-grooves 306 can be an annular micro-groove, a strip micro-groove, or a dot-shaped micro-groove. The plurality of micro-grooves 306 form concentric circular patterns, stripped patterns, or dotted patterns on the top surface of the carbon nanotube array 305. Cross-sectional shapes of the micro-grooves 306 are not limited, and can be inverted triangles, rectangles, or trapezoids.

It is indicated by existing research that the larger the surface roughness of the panel of the plane source blackbody, the higher the emissivity of the plane source blackbody. In the present disclosure, the plurality of microstructures formed on the top surface of the carbon nanotube array 305 is equivalent to an increase of the surface roughness of the panel 301 of the plane source blackbody 30, therefore the emissivity of the plane source blackbody 30 can be further increased.

The panel 301 is made from an aluminum alloy material. The first surface 302 is a flat surface.

A method for making the plane source blackbody 30 is provided in one embodiment. The method comprises the following steps:

S31, providing a panel 301, wherein the panel 301 comprises a first surface 302 and a second surface 303 opposite to the first surface 302;

S32, coating the first surface 302 with a black lacquer layer 304;

S33, placing a carbon nanotube array 305 on the first surface 302 of the panel 301;

S34, forming a plurality of micro-grooves 306 on a top surface of the carbon nanotube array 305 away from the first surface 302 of the panel 301.

A specific operation method of the step S31, S32 and S33 is the same as that of the step S11, S12 and S13 respectively, and will not be described in detail here.

In the step S34, a laser generator is provided to generate a laser beam. The laser beam is used to irradiate the top surface of the carbon nanotube array 305 to form a plurality of microstructures on the top surface of the carbon nanotube array 305. A direction in which the laser beam is incident can be at an angle to the top surface of the carbon nanotube array 305. In one embodiment, the angle ranges from about 55 degrees to about 90 degrees.

During the process of laser irradiation, since a high energy of the laser beam can be absorbed by carbon nanotubes which are on the paths of the laser beams, the temperature of the carbon nanotubes become high and the carbon nanotubes can react with the oxygen in the air, and then decompose. Thus, the carbon nanotubes on the paths of the laser beams will be removed. In this way, a plurality of micro-grooves 306 with predetermined depth and width can be formed on the top surface of the carbon nanotube array 305. A scanning path of the laser beam can be set precisely by a computer in advance to form a complex etched pattern on the top surface of the carbon nanotube array.

Figure 4:
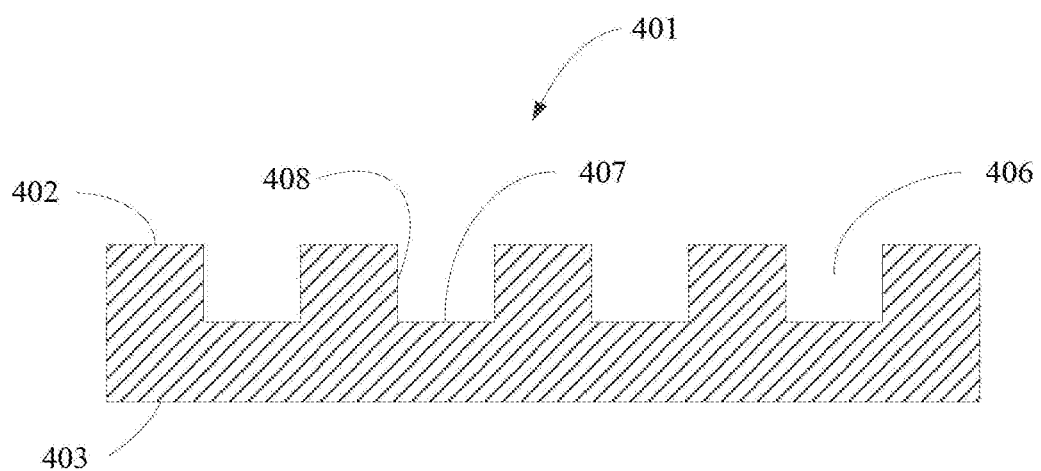
FIG. 4 is a schematic view of a cross-sectional shape of one embodiment of a panel.
Figure 5:
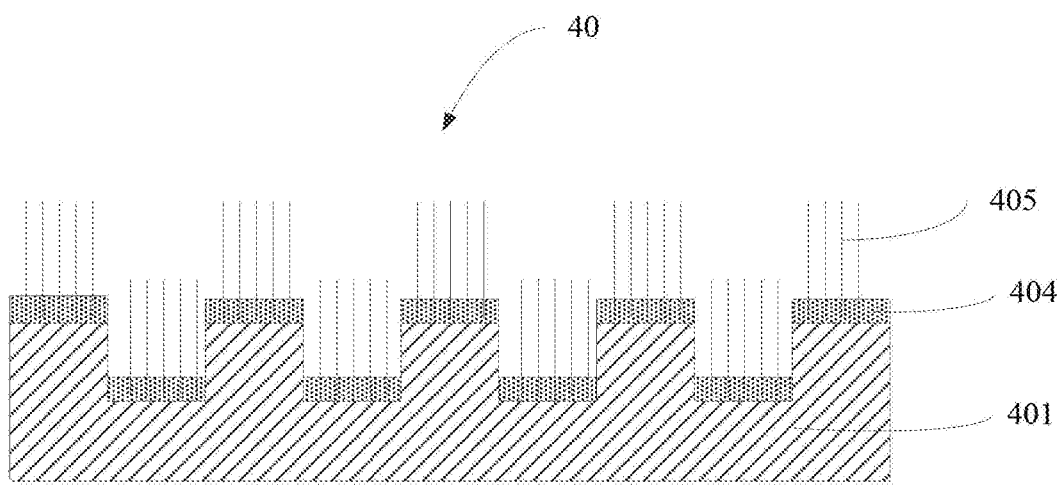
FIG. 5 is a schematic view of a cross-sectional shape of a plane source blackbody using the panel in FIG. 4.

Referring to the FIG. 4 and FIG. 5, a plane source blackbody 40 is provided in one embodiment. The plane source blackbody 40 comprises a panel 401. The panel 401 comprises a first surface 402 and a second surface 403 opposite to the first surface 402. A black lacquer layer 404 and a carbon nanotube array 405 are formed on the first surface 402 of the panel 401. The carbon nanotube array 405 comprises a plurality of carbon nanotubes. Each of the carbon nanotubes comprises a top end and a bottom end. The bottom end of each of the carbon nanotubes is immersed into the black lacquer 404, and the top end of each of the carbon nanotubes is exposed out from the black lacquer layer 304. The plurality of carbon nanotubes are substantially perpendicular to the first surface 402 of the panel 401.

The panel 401 is made from a hard aluminum material. The first surface 402 comprises a plurality of grooves 406 spaced apart from each other.

The plurality of grooves 406 are arranged in a matrix manner. Each of the grooves 406 can be a strip groove, an annular groove, or a dot-shaped groove. Cross-sectional shapes of the grooves 406 can be rectangles or trapezoids. The grooves 406 can be formed via a method of casting or etching the panel 401. In one embodiment, the grooves 406 are strip grooves, and cross-sectional shapes of the grooves 406 are rectangles.

Each of the grooves 406 comprises a bottom surface 407. The bottom surface 407 is a flat surface. The plurality of carbon nanotubes can be located on the bottom surfaces 407 of the grooves 406 and the first surface 402 of the panel 401 simultaneously.

Each of the grooves 406 comprises a side surface 408. The side surface 408 is coated with the black lacquer, or the side surface 408 is not coated with the black lacquer. In one embodiment, the side surface 408 is not coated with the black lacquer.

A method for making the plane source blackbody 40 is provided in one embodiment. The method comprises the following steps:

S41, providing a panel 401, wherein the panel comprises a first surface 402 and a second surface 403 opposite to the first surface 402, and the first surface 402 comprises a plurality of grooves 406 spaced apart from each other;

S42, coating bottom surfaces 407 of the grooves 406 and the first surface 402 of the panel 401 with a black lacquer layer 404 respectively;

S43, placing a plurality of carbon nanotubes on both the bottom surfaces 407 of the grooves 406 and the first surface 402 of the panel 401.

In the step S41, the grooves 406 are strip grooves. Cross-sectional shapes of the grooves 406 are rectangles.

In the step S42, the method of coating the black lacquer layer 404 can be a method of spin coating, spraying or scraping.

In the step S43, the plurality of carbon nanotubes can be placed on both the bottom surfaces 407 of the grooves 406 and the first surface 402 of the panel 401 via a method of transfer. The method comprises the following steps:

S431, providing a substrate, wherein a surface of the substrate comprises a plurality of protrusions spaced apart from each other, a shape, a size and positions of the protrusions are corresponding designed to matched the shape, the size and the positions of the grooves on the first surface 402 of the panel 401 respectively, and a plurality of carbon nanotubes are respectively grown on a top surface of the protrusion and the surface of the substrate, and the plurality of carbon nanotubes are substantially perpendicular to the surface of the substrate;

S432, transferring the plurality of carbon nanotubes to the panel 401, wherein the plurality of carbon nanotubes on the top surface of the protrusion of the substrate are transferred to the bottom surface of the groove of the panel, and the plurality of carbon nanotubes on the surface of the substrate are transferred to the first surface 402 of the panel 401.

The blackbody radiation source provided by the present disclosure has the following characteristics.

Firstly, carbon nanotubes are currently the blackest material in the world. Tiny gaps between carbon nanotubes in a carbon nanotube array can prevent an incident light from being reflected off a surface of the array, so the emissivity of the carbon nanotube array is high. The emissivity of the carbon nanotube array is as high as 99.6% according to a measurement, which is far larger than that of known inner surface materials of the blackbody cavity. For example, the emissivity of NEXTEL® Velvet 811-21 black lacquer is 96%.

Secondly, the carbon nanotubes can be prepared conveniently and quickly by a chemical vapor deposition of carbon source gas under high temperature conditions, and the raw materials are cheap and easy to obtain.

Thirdly, the carbon nanotubes have excellent thermal conductivity. So it can improve the temperature uniformity and stability of the plane source blackbody to use the carbon nanotube array as the surface material of the plane source blackbody.

Fourthly, the carbon nanotubes have excellent mechanical properties, so the plane source blackbody using carbon nanotubes will have good stability and may not be easily damaged in harsh environment.

Fifthly, a black lacquer is also located on the surface of the panel. The black lacquer is not only a high emissivity material but also functioned as a glue to keep the plurality of carbon nanotubes fixed on the surface of the panel. Thereby the emissivity of the plane source blackbody is further improved, the stability of the plane source blackbody is further enhanced, and the service life of the plane source blackbody is further prolonged.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A plane source blackbody comprising:
   a panel comprising a first surface and a second surface opposite to the first surface;
   a black lacquer layer on the first surface of the panel;
   a carbon nanotube array on the first surface of the panel, wherein the carbon nanotube array comprises a plurality of carbon nanotubes, each of the carbon nanotubes comprises a top end and a bottom end, the bottom end of each of the carbon nanotubes is immersed into the black lacquer layer and the top end of each of the carbon nanotubes is exposed out from the black lacquer layer, and the plurality of carbon nanotubes are substantially perpendicular to the first surface of the panel.

2. The plane source blackbody of claim 1, wherein the top end of each of the carbon nanotubes is an open end.

3. The plane source blackbody of claim 1, wherein the first surface of the panel is partially covered by the carbon nanotube array.

4. The plane source blackbody of claim 1, wherein a plurality of micro-grooves are formed on a surface of the carbon nanotube array away from the first surface of the panel.

5. The plane source blackbody of claim 4, wherein each of the micro-grooves is an annular micro-groove, a strip micro-groove, or a dot-shaped micro-groove.

6. The plane source blackbody of claim 4, wherein cross-sectional shapes of the micro-grooves are inverted triangles, rectangles, or trapezoids.

7. The plane source blackbody of claim 1, wherein a thickness of the black lacquer layer is in a range from 1 micrometer to 300 micrometers.

8. The plane source blackbody of claim 1, wherein the plane source blackbody further comprises a heating element on the second surface of the panel.

9. The plane source blackbody of claim 8, wherein the heating element comprises a carbon nanotube structure, a first electrode and a second electrode, and the first electrode and the second electrode are spaced apart from each other on a surface of the carbon nanotube structure.

10. The blackbody radiation source of claim 9, wherein the carbon nanotube structure comprises a plurality of carbon nanotubes joined end to end and substantially oriented along a same direction, and the plurality of carbon nanotubes of the carbon nanotube structure extend from the first electrode towards the second electrode.

11. The blackbody radiation source of claim 1, wherein the first surface is a flat surface.

12. The blackbody radiation source of claim 1, wherein the first surface of the panel comprises a plurality of grooves.

13. The blackbody radiation source of claim 12, wherein each of the grooves is an annular groove, a strip groove, or a dot-shaped groove.

14. The blackbody radiation source of claim 12, wherein cross-sectional shapes of the grooves are rectangles or trapezoids.

15. The blackbody radiation source of claim 12, wherein the plurality of carbon nanotubes are on a bottom surface of each of the plurality of grooves.

\* \* \* \* \*